United States Patent [19]

Vaught

[11] Patent Number: 4,490,731

[45] Date of Patent: Dec. 25, 1984

[54] INK DISPENSER WITH "FROZEN" SOLID INK

[75] Inventor: John L. Vaught, Palo Alto, Calif.

[73] Assignee: Hewlett-Packard Company, Palo Alto, Calif.

[21] Appl. No.: 443,410

[22] Filed: Nov. 22, 1982

[51] Int. Cl.³ ............................................ G01D 15/16
[52] U.S. Cl. ................................. 346/140 R; 106/22; 106/31; 219/307; 219/421; 222/146.5
[58] Field of Search ............................ 346/140 R, 1.1; 219/421, 307; 222/146 HE; 239/133, 135; 106/22, 31

[56] References Cited

U.S. PATENT DOCUMENTS

| | | | |
|---|---|---|---|
| 3,247,519 | 4/1966 | Sihvonen | 346/140 |
| 3,653,932 | 4/1972 | Berry | 346/140 X |
| 3,715,219 | 2/1973 | Kurz | 346/1.1 X |
| 4,296,421 | 10/1981 | Hara | 346/140 |
| 4,349,829 | 9/1982 | Bovio et al. | 346/140 R |
| 4,390,369 | 6/1983 | Merritt | 106/20 X |

Primary Examiner—Joseph W. Hartary
Attorney, Agent, or Firm—Jeffery B. Fromm

[57] ABSTRACT

A new type of apparatus for dispensing "frozen" solid ink and the ink for use therein for printing on paper is disclosed. The ink dye vehicle is chosen to have a melting point above room temperature, so that the ink which is melted in the apparatus will not be subject to evaporation or spillage during periods of non-printing. The vehicle is also chosen to have a low critical temperature to permit the use of the solid ink in a thermal ink jet printer.

10 Claims, 1 Drawing Figure

INK DISPENSER WITH "FROZEN" SOLID INK

BACKGROUND OF THE INVENTION

Liquid ink (i.e., a liquid vehicle with dissolved dye pigment) used in many types of printers is stores in a reservoir and delivered by a capillary tube to a printing nozzle. In a non-impact printer such as a liquid ink jet printer, this ink is forced out of the nozzle in the form of a jet of liquid droplets by heating a resistance element in close proximity to the nozzle. The ink itself is then directed at a printing media such as paper to form lines or dots. The dye is then fixed to the paper by evaporation and absorption.

Unfortunately, because the ink is a liquid composed of a solvent used as the transport vehicle for the ink dye, the nozzle tends to clog due to evaporation of the solvent during periods of non-printing. Typically, this can happen in a period of less than five minutes when the solvent chosen is fast drying such as pure water. Slow drying solvents take longer to evaporate and clog the nozzle, but at the expense of a long drying time for the print on the paper. Also, since dyes in evaporative inks are carried by capillary action into the paper pores during drying, the print density of such inks is quite limited due to the thin layer of dye that remains on the paper surface.

Additionally, because the ink is a liquid, there is also the potential for spillage during handling.

One method of eliminating several of the problems due to the use of liquid ink is the erosion by means of an electric arc of a solid ink directly onto the paper as disclosed by Bovio, et al., in U.S. Pat. No. 4,349,829 issued Sept. 14, 1982. Unfortunately, the Bovio system requires not only the use of an electrically conductive ink, but also a high and potentially dangerous electric potential to move the ink from the reservoir to the paper.

SUMMARY OF THE INVENTION

The present invention solves the problems of the prior art by utilizing a new and novel "frozen" solid ink which depends on solidification to fix the dye to the paper. The dye vehicle is chosen so as to not only be a good solvent for dyes and be low in toxicity, but also the solvent is chosen so as to be a solid at room temperature (25° C.). This solid ink can then be melted by the disclosed apparatus and utilized as a liquid in a manner similar to many conventional techniques. Because the molten ink solidifies immediately upon contact with the paper, the dye itself remains on the paper surface as in offset printing, thus permitting a greater range of print density and quality.

The preferred embodiment of the solid ink delivery apparatus melts the ink in a portion of the solid ink reservoir without having to melt the entire reservoir of ink. In addition a heater is provided which guarantees that the ink is kept in a liquid state as the ink is transported to the exist nozzle.

When the thermal ink jetting process is used to eject ink from the nozzle by means of a jet resistor, in order to prevent undue thermal stress on the jet resistor it is also necessary to select the vehicle to have a low critical temperature (i.e., the temperature at which a liquid will boil independent of the pressure exerted on the liquid).

DETAILED DESCRIPTION OF THE DRAWING

Figure 1:
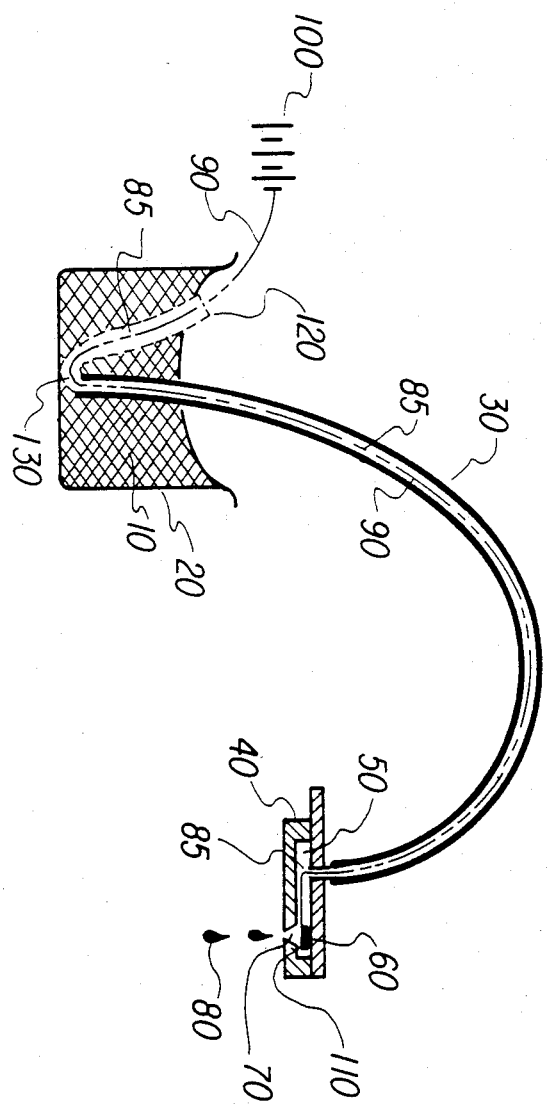

FIG. 1 shows the apparatus for melting and delivering the solid ink of the present invention in a thermal ink jet printing system.

DETAILED DESCRIPTION OF THE INVENTION

A new "frozen" solid ink and a delivery system is disclosed for printing on recording media such as paper. Ink is a dye dissolved in a solvent which acts as a transport vehicle until the ink dries or solidifies on the recording media. This vehicle should be a good solvent for the particular dye chosen and for safety reasons the vehicle should have low toxicity. In the present invention, the ink vehicle used is selected so as to be frozen in the solid state at room temperature (25° C.). The solid ink can then be melted and used in its liquid state as an ordinary ink. While in the non-printing mode, the ink is a solid and there is no chance of spillage. In addition, the vapor pressure of the vehicle while it is in its solid state should be selected to be low. The low rate of sublimation of the solid vehicle allows indefinite periods of non-printing without the danger of nozzle clogging even without nozzle capping.

In a thermal ink jet printer a further restraint on the choice of vehicles is required because in such a system the liquid ink is forced out of the jet nozzle when a jet resistor is heated close to the critical temperature of the vehicle. Thus, to prevent undue thermal degradation of the jet resistor, the vehicle should have a critical temperature below that degradation temperature. For example, tantalum/aluminum film resistors should not exceed 500° C. Since a passivation layer of 1.0 micron silicon dioxide having a thermal drop of 100° C. is usually used on top of such tantalum/aluminum resistors, the vehicle should then have a critical temperature below 400 degrees C. On the other hand, if metallic glass resistors are utilized which can withstand much higher temperatures than tantalum/aluminum film resistors and do not require a passivation layer, the critical temperature of the vehicle can be 800° C. to 900° C.

An example of a vehicle suitable for use with either tantalum/aluminum or metallic glass resistors is a binary combination of "E" Wax, a derivative of montan wax, available from the BASF Wyandotte Corp. of Holland, Mich. a subsidiary of BASF Ag, Federal Republic of Germany, with a melting point (M.P.) of 77° C. to which between 20–70% by volume isopropal alcohol has been added to reduce the critical temperature below 400° C. With 50% isopropal alcohol this mixture is a solid with low vapor pressure up to its 71° C. melting point. A second suitable vehicle is "V" Wax, which is a polyvinyl ether wax, also available from the BASF Wyandotte Corp., saturated with 30% by volume isopropal alcohol. The vehicle may also be a high vapor pressure, low critical temperature solid such as 2,2-dimethyl-1-propanol $(CH_3)_3CCH_2OH$ (neopentyl alcohol) M.P.=52° C., or 2,2- difluorotetrachloroethane $CCl_3CClF_2$, M.P.=41° C. along with appropriate binders such as a soluable varnish (i.e., alkyd resins) as used in offset printing to bind the dye or pigment to the paper even if the vehicle has sublimed off the paper.

In order to deliver this solid ink to the recording media, the ink dispensing system must be able to melt the ink. In addition, the creation of the liquid "free surface" to permit the ink to feed through the associated tubing should be accomplished without have to melt the entire amount of solid ink as this would require excessive power and warm-up time.

FIG. 1 shows the apparatus for accomplishing these goals in a thermal ink jet printing system. The frozen ink 10 is stored in a reservoir 20. A supply tube 30 connects the reservoir 20 to the head assembly 40. Inside the head assembly 40 is a small head reservoir 50 where the jet resistor 60 boils the ink which is then discharged through the nozzle 70 in the form of a jet of ink 80.

In order to melt the frozen ink 10 and to keep it in a liquid state 85 while printing, a resistance heating wire 90 coupled to a power supply 100 is passed through the frozen ink 10, through the supply tube 30, and through the head reservoir 50 and attached to an electrical common connection 110 in the head assembly 40.

Ordinarily the jet resistor 60 is pulsed with electrical current to create the ink jet 80. In addition, in the present invention the jet resistor 60 may be continuously heated by supplying direct current through the jet resistor 60 or by adding separate heating resistors to the head (not shown) to insure that the ink is a liquid when printing is desired.

In order for the supply tube 30 to transport the ink by capillary action, it is necessary to create a "free surface" 120 of liquid ink 85 around the tube entrance 130. In general, it is not necessary to melt the entire reservoir of frozen ink 10; and in fact to do so would require excess power from the supply 100, as well as excess warm-up time and the unnecessary added potential for evaporation of the ink solvent in the reservoir 20. By selecting the power dissipated in the resistance wire 90, the free surface 120 of liquid ink can be kept to a minimum, and yet still fill the tube entrance 130 in much the same fashion as liquid wax feeds the wick of a wax candle.

It would be obvious to one skilled in the art that the present invention is not limited to thermal ink jet printing and the use of this invention in other types of printers and plotters can be accomplished without the inventive faculty. Therefore, the scope of this invention is limited by the following claims.

I claim:

1. An apparatus for dispensing ink which is a solid at 25° C. from a reservoir onto a recording media, said apparatus comprising:
   a feed tube having an entrance in contact with the ink in the reservoir;
   a nozzle coupled to the feed tube; and
   a resistance heater for melting the ink, said resistance heater extending from the reservoir through the feed tube to the nozzle.

2. An apparatus for dispensing ink as in claim 1 wherein the resistance heater is positioned so as to melt only the solid ink in the reservoir in immediate proximity with the entrance of the feed tube.

3. An apparatus for dispensing ink as in claim 1 further comprising:
   a jet resistor in proximity with the nozzle whereby the melted ink is forced out of the nozzle as a jet of droplets.

4. An apparatus for dispensing ink as in claim 3 wherein electric current is continuously applied to the ink jet resistor so that the ink in the nozzle is maintained in a liquid state.

5. An ink for writing on paper with a non-impact printer having expulsion means for expelling said ink from an orifice, said ink consisting essentially of:
   a dye; and
   a vehicle which is a solid at 25° C. consisting of
      solvent for said dye, said solvent having a high vapor pressure, a melting point greater than 25° C., and a critical temperature less than the degradation temperature of said expulsion means, and
      a binder with a low vapor pressure for binding said dye to said paper when said solvent has sublimed off of the paper.

6. An ink as in claim 5 wherein said solvent consists essentially of neopentyl alcohol.

7. An ink as in claim 6 wherein said binder consists essentially of a varnish soluable in said solvent.

8. An ink as in claim 5 wherein said solvent consists essentially of difluorotetrachlorenthane.

9. An ink as in claim 8 wherein said binder consists essentially of a varnish soluable in said solvent.

10. an ink as in claim 5 wherein said binder consists essentially of a varnish soluable in said solvent.

* * * * *